United States Patent
Strauch et al.

(10) Patent No.: US 12,444,197 B2
(45) Date of Patent: Oct. 14, 2025

(54) MONITORING PROCESS STATIONS UTILIZING VISUAL INDICATORS

(71) Applicant: ABB Schweiz AG, Baden (CH)

(72) Inventors: Andreas Strauch, Saint-Augustin-des-Desmaures (CA); Sylvio Laplante, Quebec (CA); Yannick Maret, Aargau (CH); Carl Robins, Perth (AU); Guillaume Alarie, Québec (CA); Sébastien Larose, Québec (CA)

(*) Notice: Subject to any disclaimer, the term of this patent is extended or adjusted under 35 U.S.C. 154(b) by 419 days.

(21) Appl. No.: 17/979,434

(22) Filed: Nov. 2, 2022

(65) Prior Publication Data

US 2024/0144687 A1 May 2, 2024

(51) Int. Cl.
*G06V 20/52* (2022.01)
*G01N 35/00* (2006.01)
(Continued)

(52) U.S. Cl.
CPC ....... *G06V 20/52* (2022.01); *G01N 35/00623* (2013.01); *G01N 35/00732* (2013.01);
(Continued)

(58) Field of Classification Search
CPC .. G06V 20/52; G06V 10/225; G06V 2201/02; G06V 2201/06; G06V 20/62; G01N 35/00623; G01N 35/00732; G06T 7/0002; G06T 7/70; G06T 2207/30232; G05B 2219/24097; G05B 2219/40607; G05B 19/0428; H04N 7/18; G01D 5/39; G06K 7/1417; G08B 7/06
See application file for complete search history.

(56) References Cited

U.S. PATENT DOCUMENTS 11,971,706 B2* 4/2024 Fanidakis .......... G05B 23/0281
2003/0138146 A1 7/2003 Johnson et al.
(Continued)

FOREIGN PATENT DOCUMENTS

EP 2280248 A1 2/2011
EP 1327121 B1 5/2011
WO 2022/182867 A1 9/2022

OTHER PUBLICATIONS

European Office Action for Application No. 23207449.2, dated Apr. 26, 2024, 7 pages.
(Continued)

Primary Examiner — Stephen R Koziol
Assistant Examiner — Michael Kim Maiden
(74) Attorney, Agent, or Firm — McCarter & English, LLP (57) ABSTRACT

In one aspect, a system includes at least one processor configured to identify a digital image of the process station generated during an operation of the process station, identify, in the digital image, a visual indicator of the process station, and analyze the visual indicator to identify a current state of the visual indicator. The at least one processor is further configured to identify configuration data for the process station that defines an expected state of the visual indicator, determine whether the current state deviates from the expected state, and generate indicia representing the identified current state in response to determining that the current state deviates from the expected state.

14 Claims, 6 Drawing Sheets

(51) Int. Cl.
  *G06T 7/00*  (2017.01)
  *G06T 7/70*  (2017.01)
  *G06V 10/22* (2022.01)

(52) U.S. Cl.
  CPC .............. *G06T 7/0002* (2013.01); *G06T 7/70* (2017.01); *G06V 10/225* (2022.01); *G06T 2207/30232* (2013.01); *G06V 2201/02* (2022.01)

(56) References Cited

U.S. PATENT DOCUMENTS

| | | |
|---|---|---|
| 2014/0064553 A1 | 3/2014 | Knauth |
| 2019/0383840 A1 | 12/2019 | Wiederin et al. |
| 2020/0409321 A1* | 12/2020 | Sanchez Del Valle . H02J 3/381 |
| 2021/0174086 A1 | 6/2021 | Cunningham et al. |
| 2021/0174131 A1* | 6/2021 | Schwartz ............... G06N 3/045 |

OTHER PUBLICATIONS

European Office Action for Application No. 23207462.5, dated Apr. 26, 2024, 7 pages.

* cited by examiner

MONITORING PROCESS STATIONS UTILIZING VISUAL INDICATORS

BACKGROUND

The field of the disclosure relates to monitoring process stations, and more particularly, to monitoring visual indicators of a process station in order to determine the condition and/or the performance of the process station.

Samples taken for analysis often require conditioning before the samples are suitable for analysis by an analysis system. For example, samples may be processed to remove unwanted components and to ensure that the sample is presented to the analysis system at the correct temperature, pressure, and flow rate to meet the requirements of the analysis system. Problems in a sample conditioning system, a type of process station, can affect the performance of the analysis system and the integrity of the analytical measurements generated by the analysis system. Sample conditioning systems may also be affected by ambient conditions, such as changes in temperature and/or the presence of gas contaminants.

Sample conditioning systems include multiple components that work together to ensure that the samples are conditioned properly. It has been observed that up to eighty percent of failures at the analysis system arise due to issues at the sample conditioning system. To monitor the performance of the sample conditioning system, various gauges that display measurements regarding the current status of the sample conditioning system and positions of valves of the sample conditioning system are manually reviewed by an operator. However, because some industrial plants may include thousands of sample conditioning systems, with each sample conditioning system including tens of valves and gauges, the monitoring rate is often low (e.g., once per day or once per week). While installing digital measurement systems at the sample conditioning systems is one option, the cost of retrofitting the thousands of sample conditioning systems currently installed in an industrial plant is cost prohibitive.

Based on the forgoing discussion, it therefore remains desirable to improve upon monitoring the conditions at and/or the performance of process stations without relying on an operator observation and/or the use of expensive instrumentation systems.

BRIEF DESCRIPTION

In one aspect, a system for monitoring a process station is provided. The system includes at least one processor configured to identify a digital image of the process station generated during an operation of the process station, identify, in the digital image, a visual indicator of the process station, and analyze the visual indicator to identify a current state of the visual indicator. The at least one processor is further configured to identify configuration data for the process station that defines an expected state of the visual indicator, determine whether the current state deviates from the expected state, and generate indicia representing the identified current state in response to determining that the current state deviates from the expected state.

In another aspect, a method of monitoring a process station is provided. The method includes identifying a digital image of the process station generated during an operation of the process station, identifying, in the digital image, a visual indicator of the process station, and analyzing the visual indicator to identify a current state of the visual indicator. The method further includes identifying configuration data for the process station that defines an expected state of the visual indicator, determining whether the current state deviates from the expected state, and generating indicia representing the identified current state in response to determining that the current state deviates from the expected state.

In another embodiment, a system for monitoring an operation of a process station is provided. The process station includes one or more instruments that visually display their measurements of the operation of the process station and one or more valves that visually display their positions. The system includes at least one processor configured to identify configuration data that defines expected values for one or more of the measurements and expected positions for the one or more valves, identify a digital image of the process station that includes digital representations of the one or more instruments and the one or more valves, and identify, based on the digital representations, current values of one or more of the measurements and current positions of the one or more valves. The at least one processor is further configured to generate indicia representing at least one of the current values of one or more of the measurements in response to determining that the current values deviate from the expected values, and the current positions of the one or more valves in response to determining that the current positions deviate from the expected positions.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general-purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

As discussed previously, manual review of the current status of a process station by an operator is typically performed infrequently, due to the large number of process stations that may be found in a typical industrial plant. Typically, an operator visually reviews various gauges and valve positions at the process station, and attempt to determine, based on experience and/or using set procedures, whether the process station is operating normally. Because this activity is often performed infrequently, due to the potentially large number of process stations that may exist in an industrial plant, the process stations may deviate from their expected performance and/or operating condition, and the deviation may go unnoticed until a follow up observation of the process station is performed by the operator. The result is that the operation of the process station may deviate from a desired operating state, which may adversely impact the downstream processes that rely on the process station. For instance, samples conditioned by a sample conditioning system and provided to a downstream analysis system may result in the samples being unusable or inaccurate when the sample conditioning system does not operate as expected.

In the embodiments described herein, digital images of a process station are captured and analyzed to identify the current states of visual indicators at the process station. In some embodiments, the visual indicators extracted from the digital images are measurements displayed by instruments at the process station. In other embodiments, the visual indicators extracted from the digital images are valve position indicators (e.g., a handle) displayed by valves at the process station. The current states of the visual indicators are compared to their expected states, and if there is a deviation between the current states and the expected states, indicia is generated. For example, a current position of a valve at the process station is compared to its expected position. If the valve is not in a correct position, indicia may be generated. The indicia may, for instance, be used to direct an operator to review the current status of the process station and address the identified issues (e.g., the operator may move the valve to its correct position). The positions of the valves at the process station and the measurements displayed by instruments at the process station are just two examples of the many possible visual indicators that may be captured and analyzed to determine if the process station is deviating from its expected operating state. Generally, the indicia generated in response to determining that a deviation between the current states and the expected states exists may include any type of information as desired. For instance, the indicia may include the current state and/or the expected state, and/or other types of information that provide information regarding how the process station is operating.

Further, the expected states may change over time as the process station transitions through different operating states. Thus, the expected states of the visual indicators may also vary over time, such that the analysis follows the changing states of the process station over time.

In one embodiment, a system is described that analyzes the digital images captured of the process station. The system may, for example, reside as a stand-alone computing device that processes digital images generated by cameras that image the process station. In other embodiments, the system may be included partly or wholly within a camera, operating as a smart camera. In other embodiments, the system may operate as a cloud-based monitoring service. In these embodiments, the cameras may upload digital images of the process station to cloud storage, which are analyzed by virtual machine(s) executing the cloud-based monitoring service.

Some examples of the visual indicators that may be monitored include, but are not limited to, the positions of the valves of the process station, the measurements (e.g., flow rates, pressures, temperatures, etc.) generated by the instruments of the process station, the rate of change of the measurements, alarm lights or indicator lights displayed at the process station, liquids and/or gasses released by the process station, vibrations generated by the process station, a discoloration present at the process station, the movement of tubes over time, etc. In another example, the process station may include one or more filters to remove particles. Over time, the filters may become clogged. If pressure sensors/indicators are available upstream and downstream of the filter, then indicia may be generated when the pressure difference between the upstream and downstream pressure sensors crosses a pre-defined threshold that indicates that the filter is clogged. An operator may then be directed to exchange the filter.

In some embodiments, the system comprises one or more cameras that capture images of the gauges, flowmeters, and other relevant visual indicators associated with the process station. The cameras may utilize wireless network connections, wired network connections, be battery operated, or hard wired to electrical power in various embodiments.

In some embodiments, the system integrates data from the image recognition activities performed on the digital images along with configuration data to assist with the interpretation of the data (e.g., configuration data associated with a specific process station).

In some embodiments, the system synchronizes the images captured from multiple cameras so that the status of different gauges can be compared simultaneously.

In some embodiments, simple visual markers on the gauges may be used to simplify the configuration and operation of the system. For example, an operator may mark an analog gauge with a marker to show the system the expected position of a needle or other type of analog display indicator of the gauge.

In some embodiments, the digital images and/or the configuration data and/or the current states of the visual indicators for the process station are stored in a central location (e.g., cloud storage). The central location may retain a history of the data to, for example, observe trends in the data that may be used to predict, diagnose, and/or generate preventative information regarding the operation of the process station. In some embodiments, visual representations of the data, advanced diagnostics, predictive and/or preventative information is provided to the operator (e.g., the maintenance staff) of the process station.

Figure 1:
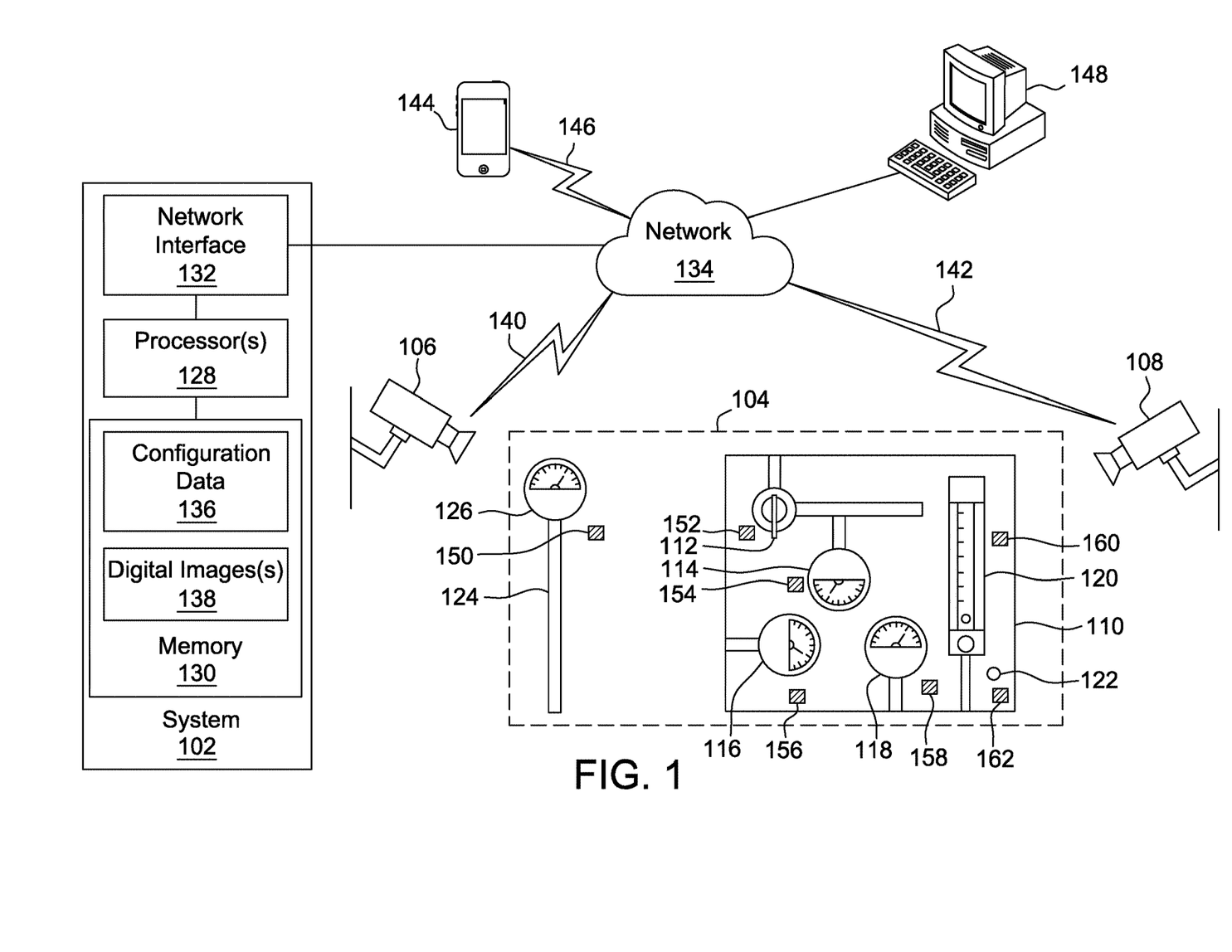
FIG. 1 is a block diagram of a system for monitoring a process station in an exemplary embodiment.

FIG. 1 depicts a block diagram of a system 102 in an exemplary embodiment. System 102 comprises any component, system, or device that performs the functionality described herein for system 102. System 102 will be described with respect to various discrete elements, which perform functions. These elements may be combined in different embodiments or segmented into different discrete elements in other embodiments.

In this embodiment, system 102 operates to monitor a process station 104 utilizing digital images captured by one or more cameras 106, 108. In some embodiments, system 102 is included partially or wholly within one or more of cameras 106, 108. In the embodiment depicted in FIG. 1, process station 104 comprises a cabinet 110, which houses a valve 112, gauges 114, 116, 118, a flowmeter 120, and a status light 122. In this embodiment, process station 104 also comprises a gauge support assembly 124 that supports a stand-alone gauge 126. The specific configuration of valve 112, gauges 114, 116, 118, 126, flowmeter 120, and status light 122 for process station 104 is merely one example configuration, and process station 104 may have other configurations in other embodiments. Thus, process station 104 may comprise any number of valves 112, gauges 114, 116, 118, 126, flowmeter 120, status lights 122, alarm lights, etc., in other embodiments.

In this embodiment, system 102 comprises one or more processors 128 communicatively coupled to a memory 130. In some embodiments, system 102 includes a network interface 132 that communicates with a network 134. In different embodiments network interface 132 may comprise a wired interface or a wireless interface. Network interface 132 may include various types of interfaces, including for example, Ethernet interfaces, Wi-Fi interfaces, or other types of wired and wireless network interfaces. Network 134 may comprise a local network of an industrial plant, and/or be communicatively coupled to other networks, such as cellular networks and/or the Internet.

In this embodiment, memory 130 of system 102 stores configuration data 136, which defines the expected positions of valve 112, the expected values of measurements generated by gauges 114, 116, 118, 126, the expected flow rate(s) measured by flowmeter 120, and the expected status of status light 122. Configuration data 136 may store multiple expected positions for valve 112, measurements of gauges 114, 116, 118, 126, flow rates of flowmeter 120, and status of status light 122, that vary as process station 104 transitions through different operating states over time. Generally, configuration data 136 is unique with respect to the expected positions, measurements, flowrates, and status of status light 122 at process station 104, and system 102 may include unique sets of configuration data 136 for other process stations, not shown.

During operation, cameras 106, 108 capture digital images 138 of process station 104, which may be provided to system 102 via wireless links 140, 142 and network 134. In other embodiments, cameras 106, 108 are communicatively coupled with network 134 via wired network connections. Digital images 138 may be stored in memory 130 of system 102 in some embodiments. Digital images 138 and/or configuration data 136 may be stored remotely from system 102 in other embodiments. For instance, digital images 138 and/or configuration data 136 may reside in cloud storage and accessed by system 102. In other embodiments, system comprises a cloud-based service that analyzes digital images 138 based on configuration data 136.

During operation, system 102 analyzes digital images 138 and generates indicia in response to determining that the current position of valve 112, and/or the current measurements of gauges 114, 116, 118, 126, and/or the current measurement by flowmeter 120, and/or the current status of status light 122, deviates from the expected position, measurements, and status as defined in configuration data 136.

In response to detecting a deviation, system 102 may provide the indicia to a remote device. In one embodiment, system 102 provides indicia regarding the deviation to user equipment (UE) 144 of an operator. UE 144 may comprise, for example, a smart phone, a tablet, etc. System 102 may communicate with UE 144 via network 134 and wireless link 146. In another embodiment, system 102 provides the indicia regarding the deviation to a remote computing system 148 of an operator. System 102 may communicate with remote computing system 148 via network 134 and wired or wireless links in different embodiments.

In another embodiment, system 102 provides information to a remote device in response to determining that the current position of valve 112, and/or the current measurements of gauges 114, 116, 118, 126, and/or the current measurement by flowmeter 120, and/or the current status of status light 122, do not deviate from the expected position, measurements, and status as defined in configuration data 136. For example, system 102 may provide information to UE 144, remote computing system 148, or another remote entity, such as a cloud storage regarding the current position of valve 112, and/or the current measurements of gauges 114, 116, 118, 126, and/or the current measurement by flowmeter 120, and/or the current status of status light 122.

In some embodiments, system 102 provides additional information to UE 144 and/or remote computing system 148. For example, system 102 may provide a current position of valve 112, the current measurements displayed by gauges 114, 116, 118, 126, and flowmeter 120, and/or the current indicator displayed by status light 122. In addition to or instead of, system 102 may provide the expected position of valve 112, the expected measurements displayed by gauges 114, 116, 118, 126, and flowmeter 120, and/or the expected indicator displayed by status light 122. In other embodiments, system 102 provides any type of additional information to UE 144 and/or remote computing system 148 that indicates to the operator that process station 104 is operating normally and/or that process station 104 is deviating from expected operation as defined in configuration data 136. For instance, system 102 may indicate to the operator, via UE 144 and/or remote computing system 148, that the current measurement displayed by gauge 114 is 50% above or below the expected measurement for gauge 114, which allows the operator to quickly determine the possible operating issues that are occurring at process station 104.

Configuration data 136 may also include contextual information that is provided to the operator, to enable the operator to recognize how process station 104 is deviating from its expected operating state. For example, system 102 may inform the operator not only that gauge 114 indicates that a temperature is 150 degrees Celsius (C) but also indicate to the operator that gauge 114 measures a temperature of a specific type of gas or liquid, and/or that gauge 114 measures the temperature of a specific step in a process being performed at process station 104. This type of information allows the operator to more fully recognize that the temperature displayed by gauge 114 is deviating from its expected temperature or range of temperatures, and also, how the temperature measured by gauge 114 relates to the overall process being performed by process station 104.

In some embodiments, system 102 generates indicia in response to detecting an unexpected rate of change of gauges 114, 116, 118, 126, and/or flowmeter 120. For instance, system 102 may analyze a sequence of digital images 138 and identify the rate of change of gauges 114, 116, 118, 126, and/or flowmeter 120, and compare the rate of change with the expected rate of change as defined in configuration data 136. In this embodiment, system 102 may generate indicia if the rate of change is greater than the expected rate of change as defined by configuration data 136. For instance, system 102 may determine that a rate of a temperature rise or decrease over time exceeds a threshold rate, and consequentially, generate indicia.

In some embodiments, process station 104 includes visual tags 150, 152, 154, 156, 158, 160, 162 proximate to gauge 126, valve 112, gauges 114, 116, 118, flowmeter 120, and status light 122, respectively. Visual tags 150, 152, 154, 156, 158, 160, 162 may be used by system 102 to identify the components of process station 104 represented by digital images 138. For instance, visual tags 150, 152, 154, 156, 158, 160, 162 may comprise bar codes, quick response (QR) codes, alphanumeric codes, asset tags, etc., which help system 102 identify the various components of process station 104 to monitor. For example, visual tag 160 proximate to flowmeter 120 may comprise a QR code, which is decoded by system 102 and used as a lookup in configuration data 136, thereby enabling system 102 to identify various expected values or range of values for the measurement displayed by flowmeter 120, along with, in some embodiments, contextual information that further defines how the measurement displayed by flowmeter 120 fits into the overall process being performed by process station 104. Visual tags 150, 152, 154, 156, 158, 160, 162, in some embodiments, instruct system 102 regarding how often to capture digital images 138 of the various components in process station 104 being monitored. For example, visual tag 160 proximate to flowmeter 120 may instruct process station 104 to capture and analyze digital images 138 of flowmeter 120 at a rate that is different from, for example, gauge 126.

Figure 2:
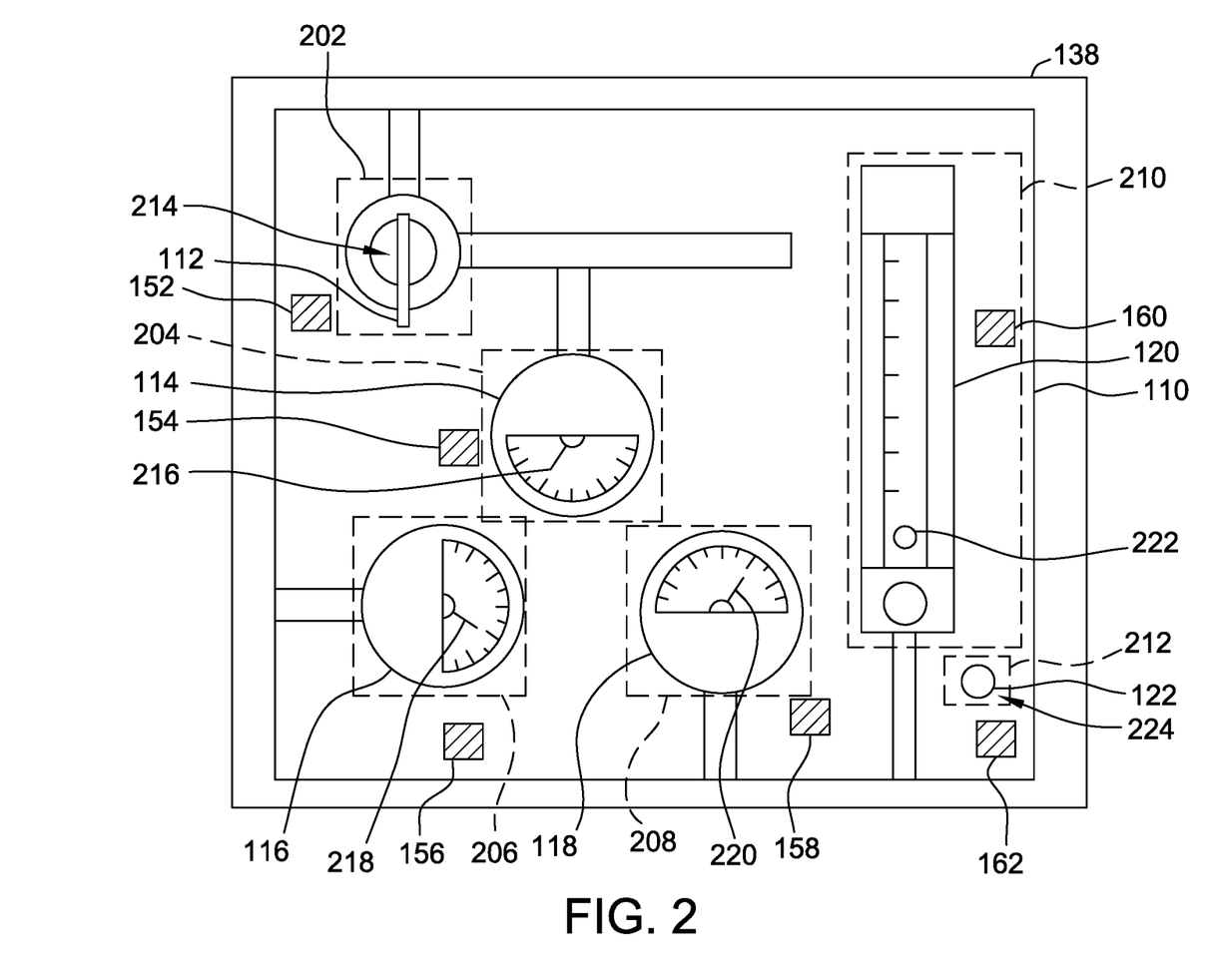
FIG. 2 depicts a digital image of various visual indicators of the process station of FIG. 1.

FIG. 2 depicts one of digital images 138 of cabinet 110 of process station 104 in an exemplary embodiment. Digital image 138 includes a number of regions 202, 204, 206, 208, 210, 212 that digitally capture valve 112, gauges 114, 116, 118, flowmeter 120, and status light 122, respectively. Each of regions 202, 204, 206, 208, 210, 212 of digital image 138 include visual indicators 214, 216, 218, 220, 222, 224 associated with the current position of valve 112, measurements displayed by gauges 114, 116, 118, measurement displayed by flowmeter 120, and the current status of status light 122, respectively. In this embodiment, region 202 represents a position of a handle of valve 112, region 204 represents a position of a needle displayed by gauge 114, region 206 represents a position of a needle displayed by gauge 116, region 208 represents a position of a needle displayed by gauge 118, region 210 represents a position of a flow ball displayed by flowmeter 120, and region 212 represents an illumination status of status light 122.

During operation, system 102 analyzes digital image 138 to identify the current state of visual indicators 214, 216, 218, 220, 222, 224. For instance, system 102 may be trained to recognize different types of valves, gauges, flowmeters, and status lights present in process station 104. Using training and pattern analysis, system 102 identifies valve 112, gauges 114, 116, 118, flowmeter 120, and status light 122 in digital image 138, and identifies the current state of their respective visual indicators 214, 216, 218, 220, 222, 224 based on their spatial relationship and/or orientation with respect to the component being evaluated.

For example, the orientation of the handle of valve 112 within region 202 of digital image 138 defines whether valve 112 is open or closed. Configuration data 136 includes information that defines how variations in the orientation and/or position of visual indicator 214 correspond to whether valve 112 is open or closed, as this is specific to not only the type of valve 112 but also to how valve 112 is mounted within cabinet 110 of process station 104.

In another example, the orientation of needles relative to gauges 114, 116, 118 within regions 204, 206, 208 of digital image 138 define the measurements displayed by gauges 114, 116, 118, respectively. Configuration data 136 includes information that defines how variations in the orientation and/or position of visual indicators 216, 218, 220 correspond to the measurements displayed by gauges 114, 116, 118, as this is specific to not only the type of gauges 114, 116, 118 but also to how gauges 114, 116, 118 are mounted within cabinet 110 of process station 104.

In another example, the orientation and/or position of the flow ball of flowmeter 120 within region 210 of digital image 138 defines the measurements displayed by flowmeter 120. Configuration data 136 includes information that defines how variations in the orientation and/or position of visual indicator 222 corresponds to the measurements displayed by flowmeter 120, as this is specific to not only the type of flowmeter 120 but also to how flowmeter 120 is mounted within cabinet 110 of process station 104.

In one embodiment, whether visual indicator 224 is present or not present within region 212 of digital image 138 defines the current status of status light 122. Configuration data 136 includes information that defines how variations in visual indicator 224 corresponds to the status displayed by status light 122. In another embodiment, whether visual indicator 224 corresponds to a particular color, flashing frequency, etc., defines the current status of status light 122.

In some embodiments, gauges 114, 116, 118 and/or flowmeter 120 include other visual features that provide information to system 102 regarding their current status. For example, gauges 114, 116, 118 and/or flowmeter 120 may be color coded such that inspection of their visual indicators 216, 218, 220, 220 conveys their current status (e.g., using red, green, and yellow background colors at gauges 114, 116, 118, and flowmeter 120). In these embodiments, system 102 may be trained to generate indicia if the needles of gauges 114, 116, 118, and/or the flow ball of flowmeter 120 move into, for example, a red-colored region of gauges 114, 116, 118, and flowmeter 120, respectively. In other embodiments, an operator may mark a face of gauges 114, 116, 118, and/or flowmeter 120 with a marker, which system 102 may use to determine if indicia should be generated if the needles of gauges 114, 116, 118 and/or the flow ball of flowmeter 120 deviate away from or outside of, the custom mark made by the operator.

Figure 3:
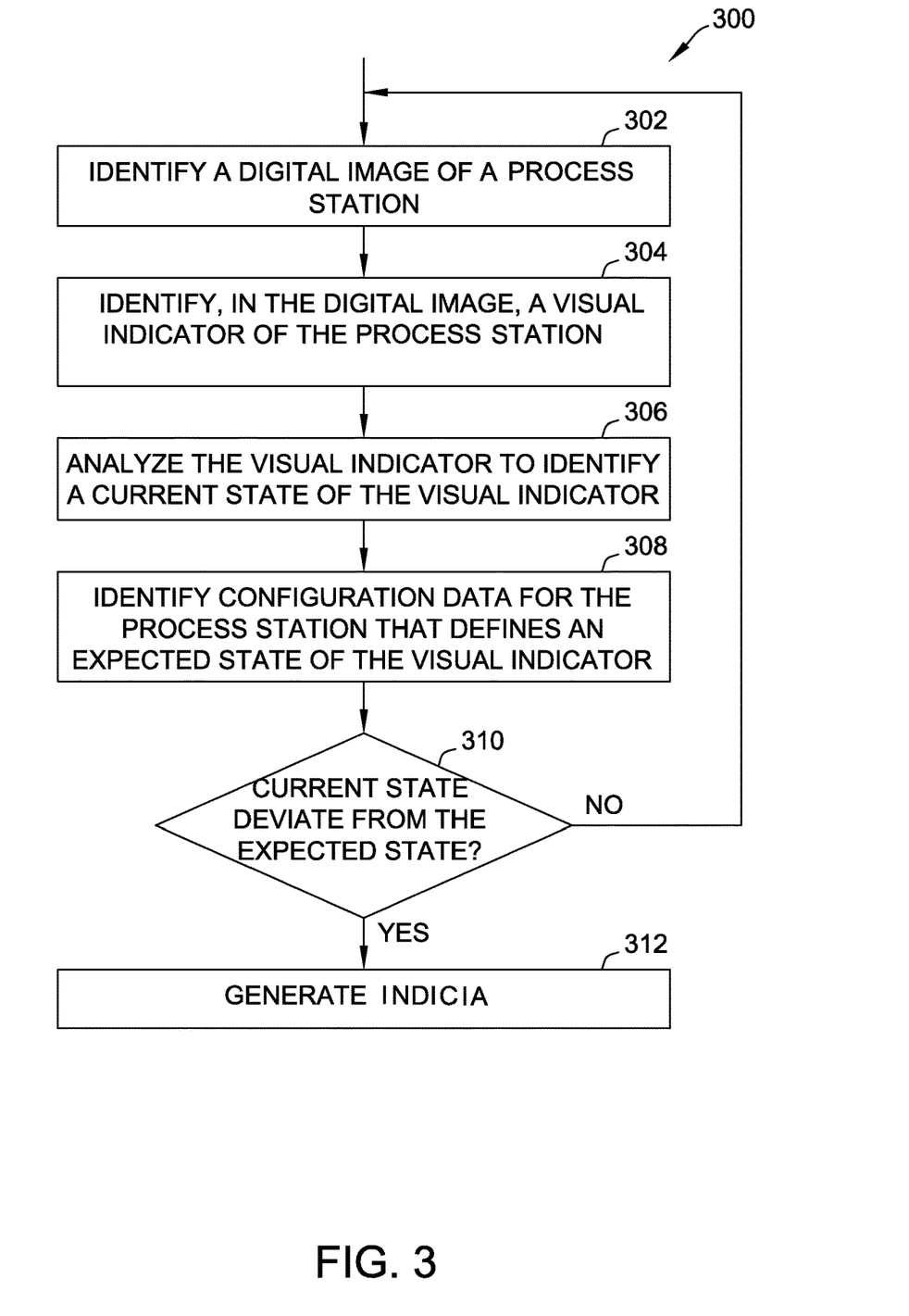
FIG. 3 is a flow chart of a method of monitoring a process station in an exemplary embodiment.
Figure 4:
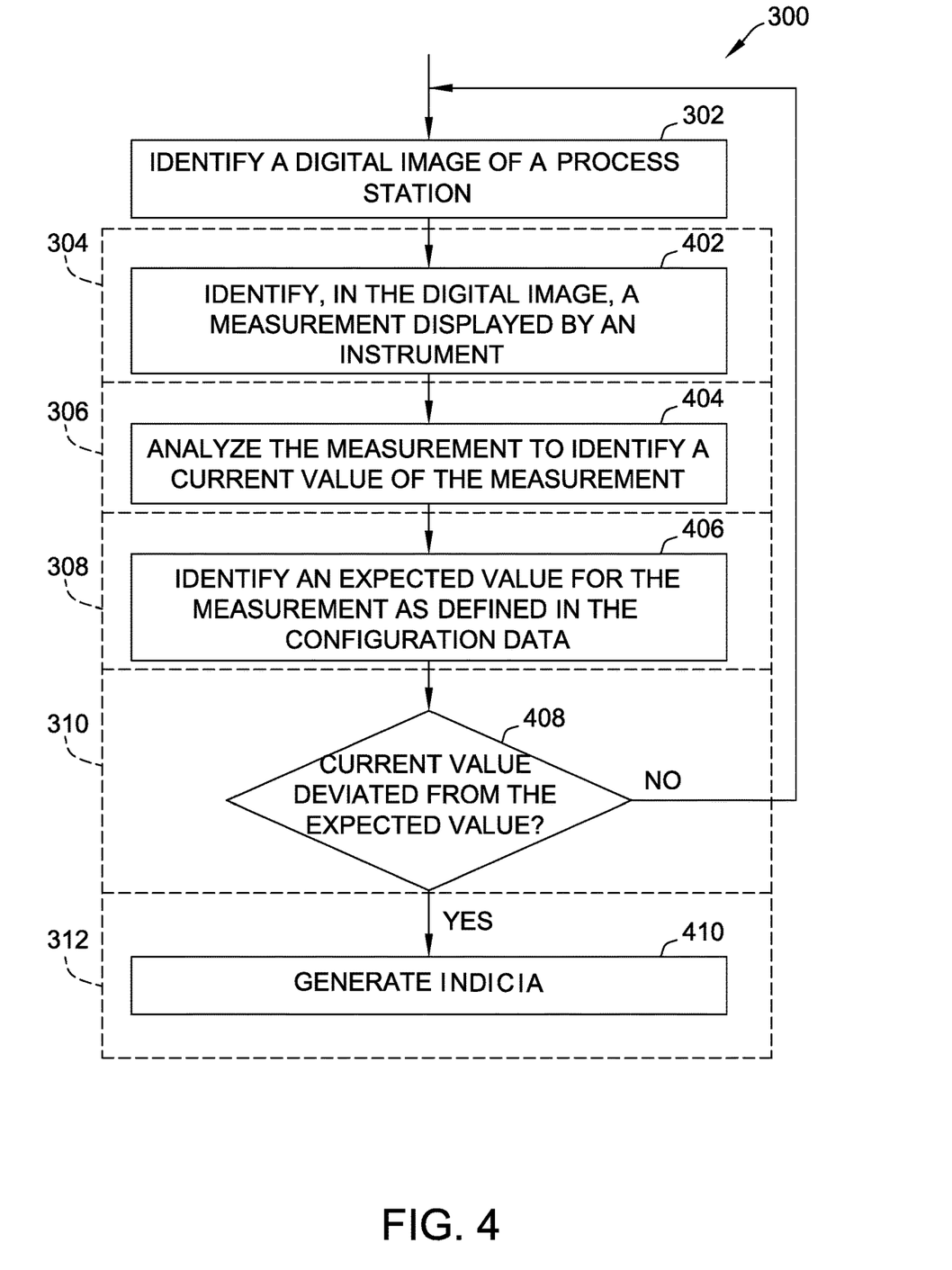
FIGS. 4-6 depict additional details of the method of FIG. 3 in exemplary embodiments.
Figure 5:
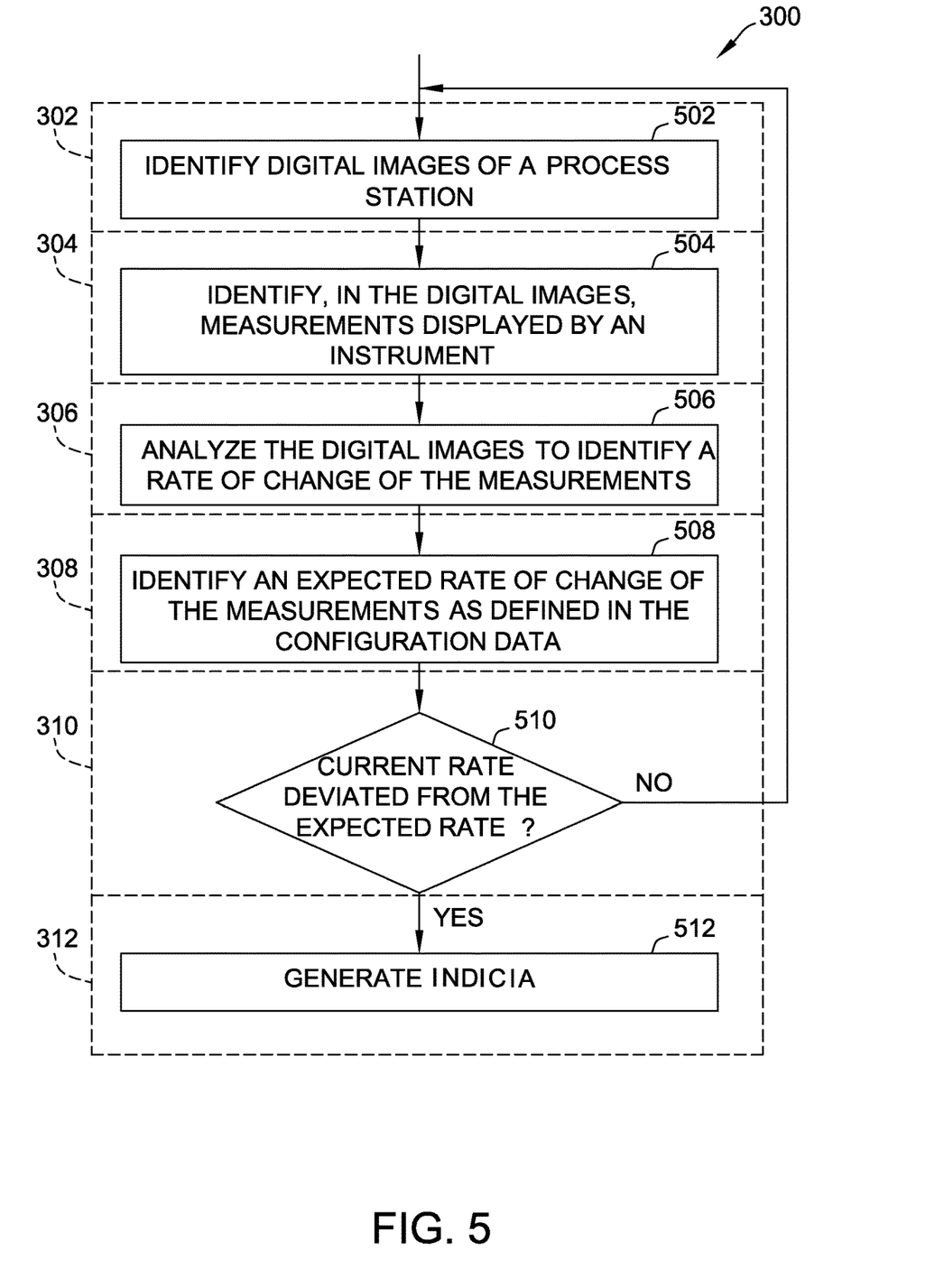
Figure 6:
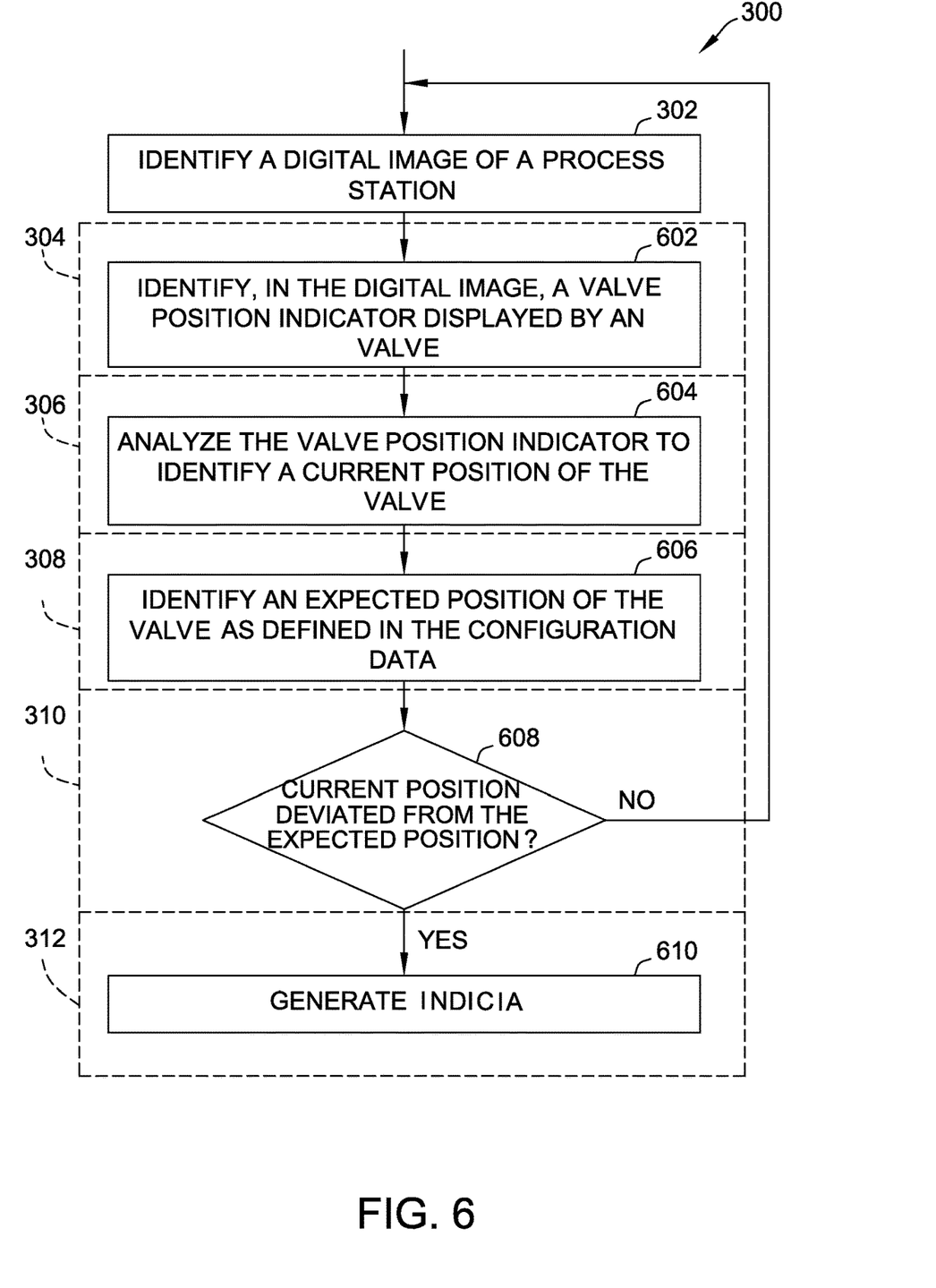

FIG. 3 is a flow chart of a method 300 of monitoring a process station in an exemplary embodiment, and FIGS. 4-6 depict additional optional details of method 300 in exemplary embodiments. Method 300 may be performed system 102 or other systems, not shown or described.

Method 300 begins by identifying (302) a digital image of the process station generated during an operation of the process station. For example, processor 128 identifies digital image 138 stored in memory 130 and generated by cameras 106, 108 (see FIG. 1).

Method 300 continues by identifying (304), in the digital image, a visual indicator of the process station. For example, processor 128 identifies one or more of visual indicators 214, 216, 218, 220, 222, 224 in digital image 138 (see FIGS. 1, 2).

Method 300 continues by analyzing (306) the visual indicator to identify a current state of the visual indicator. For example, processor 128 analyzes one or more visual indicators 214, 216, 218, 220, 222, 224 to identify the current state of one or more of visual indicators 214, 216, 218, 220, 222, 224 (see FIGS. 1, 2).

Method 300 continues by identifying (308) configuration data for the process station that defines an expected state of the visual indicator. For example, processor 128 identifies configuration data 136 that defines one or more expected states of visual indicators 214, 216, 218, 220, 222, 224 (see FIGS. 1, 2).

Method 300 continues by determining (310) whether the current state deviates from the expected state. For example, processor 128 determines whether the current state of one or more of the visual indicators 214, 216, 218, 220, 222, 224 deviate from their expected state (see FIGS. 1, 2).

Method 300 continues by generating (312) indicia representing the identified current state in response to determining that the current state deviates from the expected state. For example, processor 128 transmits indicia to, for example, UE 144 and/or remote computing system 148, which directs an operator to investigate the current status of process station 104 (see FIG. 1). The operator may then correct the issue at process station 104, thereby resolving the issue at process station 104. Generally, the indicia may include any type of information as desired. For instance, the indicia may comprise an alert generated at UE 144 and/or remote computing system 148. The alert may be provided by a noise, a vibration, etc.

In an optional embodiment, method 300 comprises identifying (402; see FIG. 4), in the digital image, a measurement displayed by an instrument of the process station. For example, processor 128 identifies a measurement displayed by visual indicator 216 (the needle) of gauge 114 (see FIG. 2).

Method 300 continues in this embodiment by analyzing (404) the measurement displayed by the instrument to identify a current value of the measurement. For example, processor 128 identifies the current value of the measurement for gauge 114 based on the position of visual indicator 216 (the needle) for gauge 114 (see FIG. 2).

Method 300 continues in this embodiment by identifying (406) an expected value of the measurement as defined in the configuration data. For example, processor 128 may analyze configuration data 136 to identify the expected value for the measurement displayed by gauge 114.

Method 300 continues in this embodiment by determining (408) whether the current value of the measurement deviates from the expected value of the measurement. For instance, processor 128 determines whether the current value of the measurement deviates from the expected value of the measurement.

Method 300 continues in this embodiment by generating (410) indicia in response to determining that the current value of the measurement deviates from the expected value of the measurement. For example, processor 128 transmits indicia to, for example, UE 144 and/or remote computing system 148, which directs an operator to investigate the current status of process station 104 (see FIG. 1). The operator may then correct the issue at process station 104, thereby resolving the issue at process station 104.

In another optional embodiment, method 300 comprises identifying (502; see FIG. 5) a plurality of digital images generated during the operation of the process station. For example, processor 128 identifies digital images 138 stored in memory 130 and generated by cameras 106, 108 (see FIG. 1).

Method 300 continues in this embodiment by identifying (504), in the digital images, measurements displayed by an instrument of the process station. For example, processor 128 identifies measurements displayed by visual indicator 216 (the needle) of gauge 114 (see FIG. 2).

Method 300 continues in this embodiment by analyzing (506) the measurements displayed by the instrument to identify a current rate of change of the measurements. For example, processor 128 identifies the current rate of change the measurement for gauge 114 based on variations in the position of visual indicator 216 (the needle) for gauge 114 over time (see FIG. 2).

Method 300 continues in this embodiment by identifying (508) an expected rate of change of the measurements as defined in the configuration data. For example, processor 128 may analyze configuration data 136 to identify the expected rate of change for the measurements displayed by gauge 114.

Method 300 continues in this embodiment by determining (510) whether the current rate of change of the measurements is greater than the expected rate of change of the measurements. For example, processor 128 determines whether the current rate of change deviates from the expected rate of change.

Method 300 continues in this embodiment by generating (512) indicia in response to determining that the current rate of change of the measurements deviates from the expected rate of change of the measurements. For example, processor 128 transmits indicia to, for example, UE 144 and/or remote computing system 148, which directs an operator to investigate the current status of process station 104 (see FIG. 1).

The operator may then correct the issue at process station 104, thereby resolving the issue at process station 104.

In yet another optional embodiment, method 300 comprises identifying (602; see FIG. 6), in the digital image, a valve position indicator displayed by a valve of the process station. For example, processor 128 identifies visual indicator 214 (the handle) of valve 112 (see FIG. 2).

Method 300 continues in this embodiment by analyzing (604) the valve position indicator to identify a current position of the valve. For example, processor 128 analyzes visual indicator 214, a valve handle in this embodiment, to identify the current position of valve 112.

Method 300 continues in this embodiment by identifying (606) an expected position of the valve as defined in the configuration data. For example, processor 128 may analyze configuration data 136 to identify the expected position of valve 112.

Method 300 continues in this embodiment by determining (608) whether the current position of the valve deviates from the expected position of the valve. For example, processor 128 determines whether the current position of valve 112 deviates from the expected position of valve 112.

Method 300 continues in this embodiment by generating (610) indicia in response to determining that the current position of the valve deviates from the expected position of the valve. For example, processor 128 transmits indicia to, for example, UE 144 and/or remote computing system 148, which directs an operator to investigate the current status of process station 104 (see FIG. 1). The operator may then correct the issue at process station 104, thereby resolving the issue at process station 104.

An example technical effect of the embodiments described herein includes at least one of: (a) improving the reliability of process stations using automated digital image monitoring; (b) reducing operator tasks associated with manually observing the operational status of the process station; (c) reducing the costs associated with automated monitoring using digital image analysis; and (d) providing automated tools for predicting failures in process stations using trends in the historical data generated while monitoring the process station.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring a plurality of process stations, the system comprising:
one or more cameras configured to capture digital images of the plurality of process stations; and
at least one processor configured to:
identify a sequence of digital images of a process station of the plurality of process stations generated by the one or more cameras during an operation of the process station;
identify, in the sequence of digital images, a visual indicator of the process station based on a quick response (QR) code arranged proximate to the visual indicator, the visual indicator comprising a measurement displayed by an instrument of the process station;
analyze the visual indicator in the sequence of digital images to identify a current rate of change of measurements displayed by the instrument;
identify, using the QR code, configuration data for the process station that defines an expected rate of change of the measurements;
determine whether the current rate of change deviates from the expected rate of change; and
generate indicia representing the identified current rate of change in response to determining that the current rate of change deviates from the expected rate of change.

2. The system of claim 1, wherein:
the measurement comprises at least one of a flow rate, a temperature, and a pressure.

3. The system of claim 1, wherein:
the visual indicator further comprises a valve position indicator displayed by a valve of the process station.

4. The system of claim 1, wherein:
the at least one processor is configured to identify, in the sequence of digital images, the visual indicator further based on a pre-defined region within the sequence of digital images.

5. The system of claim 1, wherein:
the visual indicator further comprises at least one of a status light generated at the process station, a discoloration at the process station, a gas released by the process station, a liquid released by the process station, or a vibration generated by the process station.

6. A method of monitoring a plurality of process stations, the method comprising:
capturing, by one or more cameras, digital images of the plurality of process stations;
identifying a sequence of digital images of a process station of the plurality of process stations generated by the one or more cameras during an operation of the process station;
identifying, in the sequence of digital images, a visual indicator of the process station based on a quick response (OR) code arranged proximate to the visual indicator, the visual indicator comprising a measurement displayed by an instrument of the process station;
analyzing, in the sequence of digital images, the visual indicator to identify a current rate of change of measurements displayed by the instrument;
identifying, using the QR code, configuration data for the process station that defines an expected rate of change of the measurements;
determining whether the current rate of change deviates from the expected rate of change; and
generating indicia representing the identified current rate of change in response to determining that the current rate of change deviates from the expected rate of change.

7. The method of claim 6, wherein:
the measurement comprises at least one of a flow rate, a temperature, and a pressure.

8. The method of claim 6, further comprising:
identifying, in the sequence of digital images, a valve position indicator displayed by a valve of the process station;
analyzing the valve position indicator to identify a current position of the valve;
identifying an expected position of the valve as defined in the configuration data;
determining whether the current position of the valve deviates from the expected position of the valve; and
generating the indicia in response to determining that the current position of the valve deviates from the expected position of the valve.

9. The method of claim 6, wherein identifying the visual indicator is further based on:
a pre-defined region within the sequence of digital images.

10. The method of claim 6, wherein:
the visual indicator further comprises at least one of a status light generated at the process station, a discoloration at the process station, a gas released by the process station, a liquid released by the process station, or a vibration generated by the process station.

11. A system for monitoring operations of a plurality of process stations, wherein each process station includes one or more respective instruments that visually display their measurements of an operation of the process station and one or more valves that visually display their positions, the system comprising:
one or more cameras configured to capture digital images of the plurality of process stations; and
at least one processor configured to:
identify a sequence of digital images of a process station of the plurality of process stations that includes digital representations of the one or more instruments and the one or more valves of the process station;
identify, in the sequence of digital images, quick response (QR) codes arranged proximate to the one or more instruments and the one or more valves;
identify, based on the digital representations in the sequence of digital images, one or more current rates of change of the measurements of the one or more instruments and one or more current positions of the one or more valves;
identify, based on the QR codes, configuration data that defines expected rates of change for the measurements of the one or more instruments and expected positions for the one or more valves; and
generate indicia representing at least one of:
the one or more current rates of change for the measurements of the one or more instruments in response to determining that the one or more current rates of change deviate from the expected rates of change; and
the one or more current positions of the one or more valves in response to determining that the one or more current positions deviate from the expected positions.

12. The system of claim 11, wherein:
the measurements comprise at least one of a flow rate, a temperature, and a pressure.

13. The system of claim 11, wherein:
the at least one processor is further configured to identify, in the sequence of digital images, the one or more instruments and the one or more valves based on at least one of: pre-defined regions within the sequence of digital images or the QR codes proximate to the one or more instruments and the one or more valves.

14. The system of claim 11, wherein:
the process station comprises a sample conditioning system configured to pre-condition samples of at least one of a liquid and a gas prior to submission of the samples to an analysis system.

* * * * *